United States Patent [19]

Kasai et al.

[11] Patent Number: 5,034,941
[45] Date of Patent: Jul. 23, 1991

[54] OPTICAL DISK APPARATUS HAVING AUTO-FOCUSING SERVO SYSTEMS FOR MULTIPLE LIGHT SPOTS AND METHOD OF STARTING THE AUTO-FOCUSING SERVO SYSTEMS

[75] Inventors: Masuo Kasai, Hachioji; Takeshi Maeda; Kiyoshi Matsumoto, both of Kokubunji, Japan

[73] Assignee: Hitachi, Ltd., Tokyo, Japan

[21] Appl. No.: 316,786

[22] Filed: Feb. 28, 1989

[30] Foreign Application Priority Data

Mar. 2, 1988 [JP] Japan .................................. 63-47446

[51] Int. Cl.$^5$ .......................... G11B 7/35; G11B 7/00; G11B 21/10; G11B 7/09
[52] U.S. Cl. ................... 369/44.37; 369/44.38; 369/44.29; 369/44.27; 369/112; 369/110
[58] Field of Search ............... 369/44.27, 44.29, 44.31, 369/44.37, 44.38, 110, 112

[56] References Cited

U.S. PATENT DOCUMENTS 4,841,502  6/1989  Murakami et al. .................. 369/100

Primary Examiner—Roy N. Envall, Jr.
Assistant Examiner—Hindi Nabil

Attorney, Agent, or Firm—Antonelli, Terry, Stout & Kraus

[57] ABSTRACT

A recording/reproduction head incorporates an optical system which produces two light spots on an optical disk at positions spaced out from each other by, for example, half the radial span of the effective area of the disk. In recording or reproducing information using the two light spots, the inner light spot is moved to an unused track area provided in the innermost section of the disk, an auto-focusing servo system for the inner light spot is started, a control track provided near the unused area is read to judge the compatibility of the disk, and, only when the disk compatibility is verified, the outer light spot is moved to an unused track area provided in the outermost section of the disk, and an auto-focusing servo system for the outer light spot is started by making reference to a signal to the already operating inner auto-focusing servo system. Although the outer auto-focusing servo system is started at the outermost section where the vertical swing of the disk is pronounced, the disk swing can be inferred from the signal of the already operating inner auto-focusing servo system, and therefore it can be started stably even over the outer section with a large vertical swing at a timing of minimal swing imparted by the signal of the inner auto-focusing servo system.

22 Claims, 4 Drawing Sheets

OPTICAL DISK APPARATUS HAVING AUTO-FOCUSING SERVO SYSTEMS FOR MULTIPLE LIGHT SPOTS AND METHOD OF STARTING THE AUTO-FOCUSING SERVO SYSTEMS

BACKGROUND OF THE INVENTION

This invention relates to an optical disk apparatus, and particularly to the improvement of the auto-focusing system of an optical disk apparatus which produces multiple recording/reproduction light spots with a single recording/reproduction head.

When an optical disk apparatus has its auto-focusing servo system started up and a light spot is focused on the disk surface, the amount of light returning from the optical disk to the laser source (semiconductor laser) increases suddenly and the intensity of laser emission also increases sharply due to the SCOOP (Self Coupled Optical Pickup) effect. The laser source is generally provided with an APC (Automatic Power Control) circuit for maintaining a constant laser output. However, the APC circuit with its long time-constant cannot respond to the above-mentioned sudden rise of emission and the laser intensity exceeds the recording threshold for a duration of several milliseconds, resulting possibly in the destruction of recorded data.

It is desirable to record and reproduce various types of optical disks having different characteristics with a single optical disk recording/reproduction apparatus. This requirement is dealt with by a known method in which control track information including the characteristics of each particular optical disk is recorded on the disk (generally on the innermost or outermost track) and it is read out at the operation, as disclosed in Japanese Patent Unexamined Publication No. 50-81695, for example.

SUMMARY OF THE INVENTION

An object of this invention is to start up stably the auto-focusing servo systems for multiple light spots produced by a single recording/reproduction head, while preventing the destruction of recorded data.

Another object of this invention is to start up stably the auto-focusing servo systems for multiple light spots without being affected by the vertical swing motion of the optical disk.

The inventive optical disk apparatus has its single recording/reproduction head provided with an optical system that is designed to produce a plurality of light spots, with the intention of minimizing the seek time and enhancing the data transfer rate. Preferably, the optical system is designed to produce two light spots on the disk surface spaced out from each other by half the radial span of the effective area on the disk, and the two light spots are used for recording and reproduction. Among the two light spots produced by the recording-/reproduction head of the recording/reproduction apparatus, the inner light spot has a movable range from the innermost track to a central track of the disk and the outer spot has a movable range from the central track to the outermost track.

In starting up the auto-focusing servo systems for the light spots, even with the inner light spot being positioned on the unused innermost track, the outer light spot is still located in the recording area, and data recorded in this area can be destroyed by the outer light spot. Enhancing the response of the automatic power control (APC) for the avoidance of data destruction seems unreasonable in the economical sense. Another difficulty is that an optical disk has a considerable vertical swing motion except for the innermost section due to its deformation, and the auto-focusing servo system for the outer light spot cannot be started up stably.

According to this invention, the innermost light spot is moved to the unused track area provided in the innermost section of the disk and, after the auto-focusing servo system for that light spot is started, a control track provided near the unused track area is read to judge whether the disk is compatible with the recording/reproduction apparatus. Subsequently, only when the disk compatibility has been certified the outer light spot is moved to the unused track area provided in the outermost section of the disk and the auto-focusing servo system for that light spot is started by making reference to the signal of the already operating inner auto-focusing servo system.

Since the auto-focusing servo systems for both light spots are started over the unused track areas, according to this invention, recorded data can be prevented from destruction. The inner auto-focusing servo system is started, with its light spot being located in the innermost section of the disk, and it can take place stably without a significant influence of the vertical swing of the disk. In moving the head, it is first moved to the inner section and, after the inner auto-focusing servo system has been started, the control track located in the inner section is read to judge the compatibility of the disk before proceeding to further operations, whereby needless operations can be avoided. Although the outer auto-focusing servo system is started, with its light spot being located in the outermost section where the vertical swing of the disk is pronounced, the disk swing can be inferred from the signal of the already operating inner auto-focusing servo system, and the outer auto-focusing servo system can be started up at a timing of a minimal disk swing velocity by making reference to the signal, whereby it can be started stably even over the outer section with a large disk swing. Automatic-focusing systems per se are known from such a U.S. Pat. Nos. 4,293,944, 4,450,547 and 4,742,218.

These and other objects and advantages of this invention will become more apparent from the following detailed description taken in conjunction with the accompanying drawings.

PREFERRED EMBODIMENTS

Figure 1:
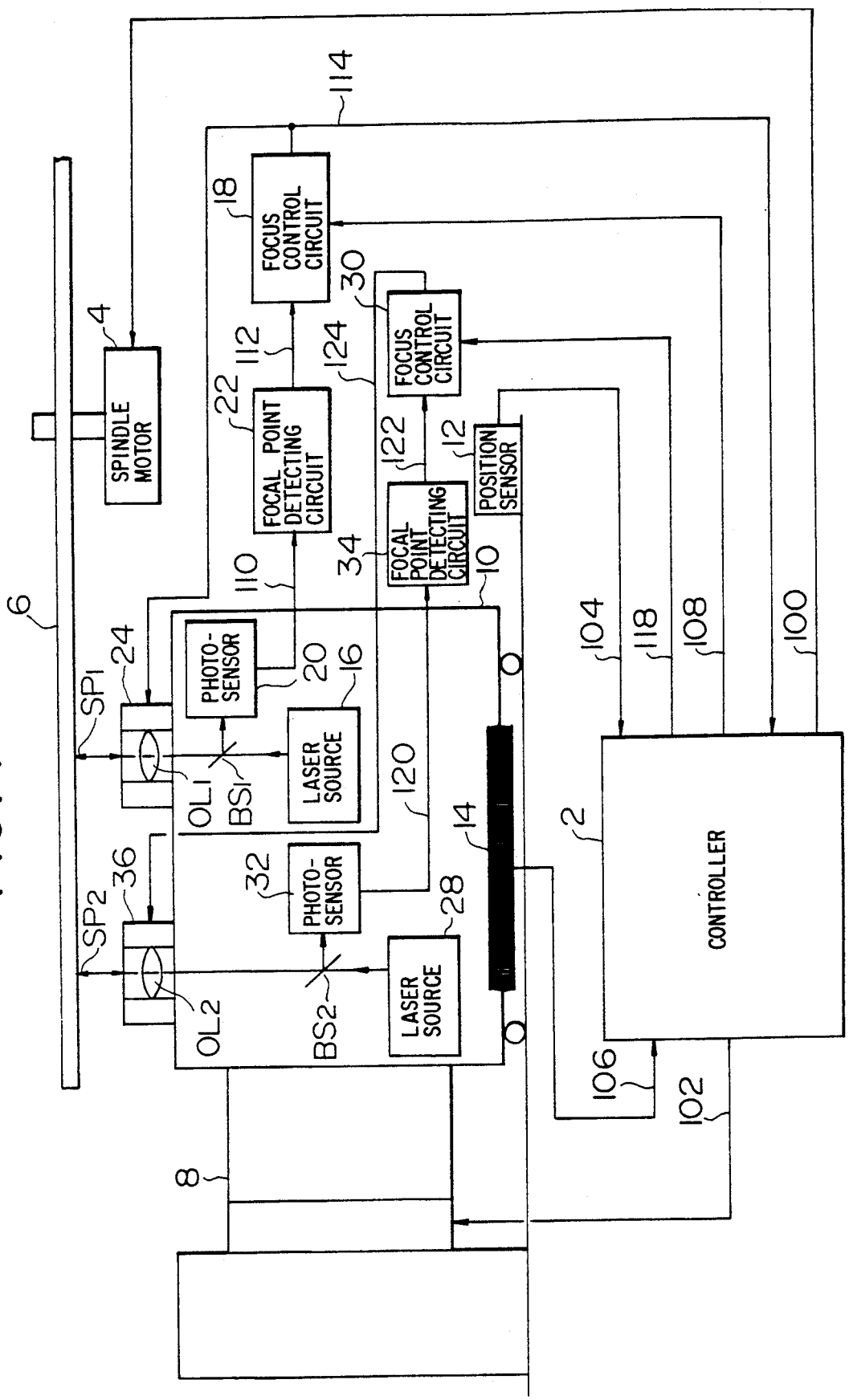
FIG. 1 is a block diagram showing the optical disk apparatus embodying the present invention.
Figure 2A:
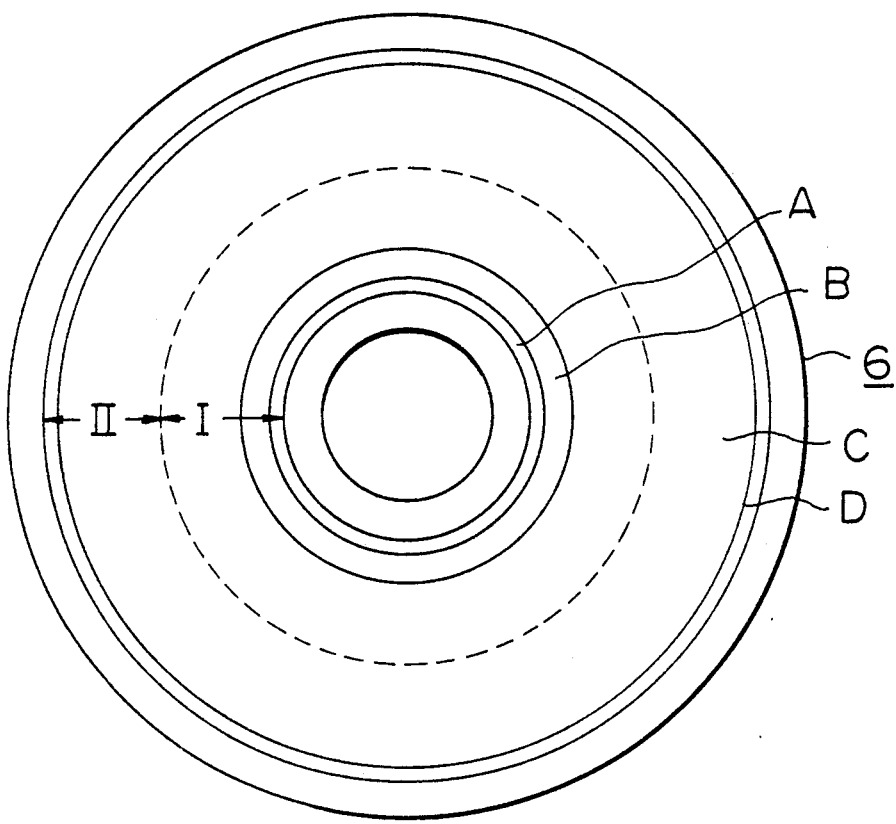
FIGS. 2A and 2B are diagrams showing, as an example, the structure of an optical disk useful for the inventive optical disk apparatus.
Figure 2B:
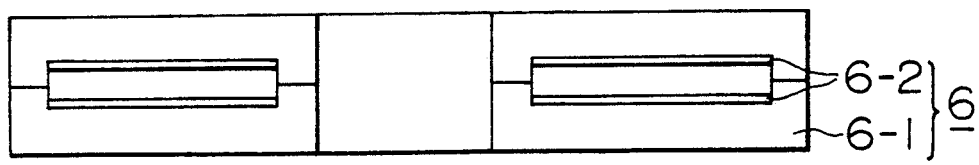

FIG. 1 shows an embodiment of the inventive optical disk recording/reproduction apparatus. At the start-up of the optical disk apparatus, a spindle motor 4 drives an optical disk 6 to rotate in response to a signal 100 from a controller 2. The optical disk 6 is made up of a substrate 6-1 and a recording film 6-2 formed on the substrate, as shown in cross-section in FIG. 2B. Shown in FIG. 2B is an example of the write-once, double-sided optical disk of the air-sandwich type. In the case of a disk for single-side recording, the recording film may be coated with a protective film. As shown in FIG. 2A, the disk surface is divided from inner to outer sections into an unused track area A where no data is recorded, a control track area B having a record of the disk type (e.g., play-back only, write-once, erasable) and characteristic information such as the laser power levels for recording and reproduction and other operational conditions, a data recording area C, and an unused track area D. The recording area C may be provided with grooves or wobbled pre-pits which serve as an optical guide for the light spot. More preferably, track address information and synchronization information may be preformatted on the disk.

The controller 2 produces a drive signal 102 to drive a linear motor 8, thereby moving a recording/reproduction head 10 inwardly over the disk 6. The recording-/reproduction head 10 incorporates laser sources 16 and 28 and associated optical systems, so that the laser beams emitted by the laser sources are projected at different positions on the disk surface to form light spots $SP_1$ and $SP_2$, respectively. The light spots $SP_1$ and $SP_2$ are spaced out from each other by approximately half the radial span of the effective area which covers the unused area A, control track area B, recording area C and unused area D, so that the light spots evenly share the total area. The light spot $SP_1$ for the inner section has a movable range I from the innermost track to a central track, and the light spot $SP_2$ for the outer section has a movable range II from the central track to the outermost track, as shown in FIG. 2A.

When the recording/production head 10 has reached the innermost area, a position sensor 12 produces an origin signal 104. The controller 2 responds to this signal to implement position lock for the recording/reproduction head 10 using the head position signal 106 from a linear encoder 14 and the drive signal 102, and thereafter activates the inner laser source 16 and issues a start-up signal 108 for the auto-focusing servo system of $SP_1$ to an inner focus control circuit 18. At this time, the inner light spot $SP_1$ is placed in the unused track area A in the innermost section of the disk 6. The light spot $SP_1$ is reflected on the disk surface and, after being separated from the light from the laser source 16 by a beam splitter BS1, it is introduced to a photosensor 20. From the output signal 110 of the photosensor 20, a focal point detecting circuit 22 produces an out-of-focus signal 112, which is delivered to the inner focus control circuit 18. The out-of-focus signal is actually produced by an out-focus detecting optical system (not shown) provided between the beam splitter BS1 and photosensor 20. Among various such optical systems available, those disclosed in U.S. Pat. Nos. 4,293,944, 4,450,547 and 4,742,218 can be used. This arrangement is common to the outer light spot $SP_2$ and to the following embodiments of FIGS. 3 and 4.

The output signal 114 of the focus control circuit 18 drives an actuator 24 fitted on an inner objective lens OL1 so that the lens OL1 is moved vertically in proportion to the detected out-of-focus value, thereby controlling the inner light spot $SP_1$ to be focused on the recording plane of the optical disk 6. Subsequently, the controller 2 uses the head position signal 106 to produce a drive signal 102 for moving the head 10, thereby bringing the inner light spot $SP_1$ to the control track area B on the disk. The control track area B having a record of disk characteristic information has a relatively wide track width, and it can be read out without tracking control.

In case the disk characteristic information read out on the control track reveals that the optical disk 6 which is currently mounted is incompatible with the apparatus, the start-up signal 108 to the inner auto-focusing servo system is removed, the inner laser source 16 is inactivated, the rotation of the disk 6 which is driven by the spindle motor 4 in accordance with the signal 100 is stopped, and the operation for this optical disk is aborted at this time, whereby further needless operations can be avoided.

On the other hand, when the optical disk 6 mounted currently is found to be compatible, the controller 2 uses the head position signal 106 to produce a drive signal 102 to the linear motor 8 for moving the head 10, thereby bringing the inner light spot $SP_1$ to a track in the recording area C on the disk. Subsequently, the light spot $SP_1$ is subjected to tracking control by the tracking control circuit (not shown), and the address of the track on which the light spot $SP_1$ is located is read out.

The controller 2 uses the head position signal 106 to produce a drive signal 102 thereby to bring the inner light spot $SP_1$ to a central track in the recording area C. The distance between the inner light spot $SP_1$ and outer light spot $SP_2$ is predetermined such that when the inner light spot SP is on a central track in the recording area, the outer light spot $SP_2$ is located on the unused track area D provided in the outermost section of the disk 6. Therefore, when the controller 2 activates the outer laser source 28 following the positioning of the inner light spot $SP_1$ to a central track, the outer light spot $SP_2$ is placed in the unused area D on the optical disk 6.

The light spot $SP_2$ is reflected by the optical disk 6 and, by being separated from the light from the laser source 28 by a beam splitter BS2, it is introduced to a photosensor 32. Based on the output signal 120 of the photosensor 32, a focal point detecting circuit 34 produces an out-of-focus signal 122, and it is delivered to an outer focus control circuit 30. The controller 2 recognizes the upper maximum and lower maximum swing points of the optical disk 6 by observing the signal which drives the inner actuator 24. The upper and lower maximum swing points are generally coincident in time with the maximum and minimum values of the signal 114.

At this time, the controller 2 issues an auto-focusing servo system start-up signal 118 to the outer focus control circuit 30. The output signal 124 of the focus control circuit 30 drives an actuator 36 fitted on an outer objective lens OL2 so that the lens OL2 is moved vertically, thereby controlling the outer light spot $SP_2$ to be focused on the optical disk 6.

Both light spots $SP_1$ and $SP_2$ are now focused on the recording plane, and they are positioned on intended tracks in the recording area C. The inner light spot SP is used for tracks in the range I, and the outer light spot $SP_2$ is used for tracks in the range II for data recording or reproduction.

Figure 3:
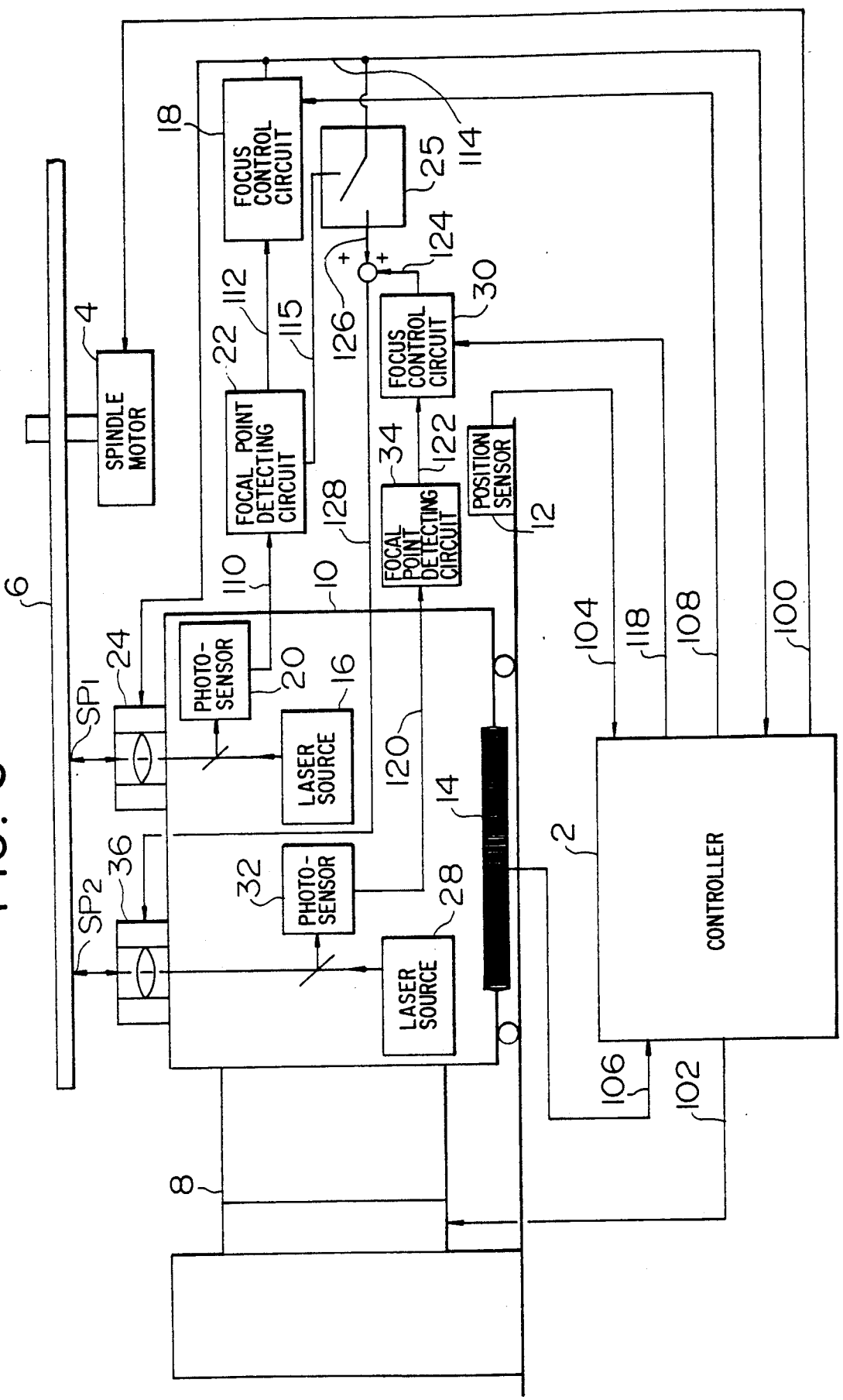
FIG. 3 is a block diagram showing another embodiment of this invention.

FIG. 3 shows another embodiment of the inventive optical disk apparatus. In this embodiment, the focus control system of outer light spot $SP_2$ shown in FIG. 1 is provided with a feed forward signal 126 from the focusing servo system of inner light spot $SP_1$, with the intention of further stabilizing the start-up of auto-focusing for the outer light spot.

At the start-up of the optical disk apparatus, the spindle motor 4 drives the optical disk 6 to rotate in response to the signal 100 from the controller 2. The controller 2 produces the drive signal 102 to drive the linear motor 8, thereby moving the recording/reproduction head 10 inwardly over the disk 6. When the recording/reproduction head 10 has reached the innermost area, the position sensor 12 produces the origin signal 104. The controller 2 responds to this signal to implement position lock for the recording/reproduction head 10, and thereafter activates the inner laser source 16 and issues the start-up signal 108 to the inner focus control circuit 18 thereby to start the inner auto-focusing servo system. The output signal 114 of the focus control circuit 18 drives the inner objective lens actuator 24 so that the lens is moved vertically, thereby controlling the inner light spot $SP_1$ to be focused on the recording plane of the optical disk 6. The operations up to this point are identical to the preceding embodiment of FIG. 1.

When the focal point detecting circuit 22 detects that the light spot $SP_1$ has been focused correctly on the disk, the completion signal 115 closes a switch 25 which has been open, and the output signal 114 is sent as a feed forward signal 126 to the auto-focusing servo system for the outer light spot $SP_2$. Subsequently, the controller 2 uses the head position signal 106 to produce the drive signal 102 for moving the head 10 so that the inner light spot $SP_1$ comes into the control track area B on the optical disk.

In case the control track information reveals that the optical disk 6 is incompatible with the apparatus, the start-up signal 108 is removed, the inner laser source 16 is inactivated, the rotation of the disk 6 which is driven by the spindle motor 4 in accordance with the signal 100 is stopped, and the operation for this optical disk is aborted at this time point. On the other hand, when the optical disk 6 is found compatible, the controller 2 uses the head position signal 106 to produce the drive signal 102 thereby to bring the inner light spot $SP_1$ to a central track in the recording area C, and, after positioning the inner light spot $SP_1$, activates the outer laser source 28, as in the preceding embodiment of FIG. 1.

Upon detecting the upper maximum or lower maximum swing point of the optical disk 6 through the observation of the output signal 114 which drives the inner lens actuator 24, the controller 2 issues the auto-focusing servo system start-up signal 118 to the outer focus control circuit 30. In this embodiment, the output signal 124 of the focus control circuit 30 is added to the feed-forward signal 126 which predicts the vertical swing of the disk, and the resulting signal 128 drives the actuator 36 so that the outer objective lens is moved vertically, thereby controlling the outer light spot $SP_2$ to be focused on the optical disk 6.

Figure 4:
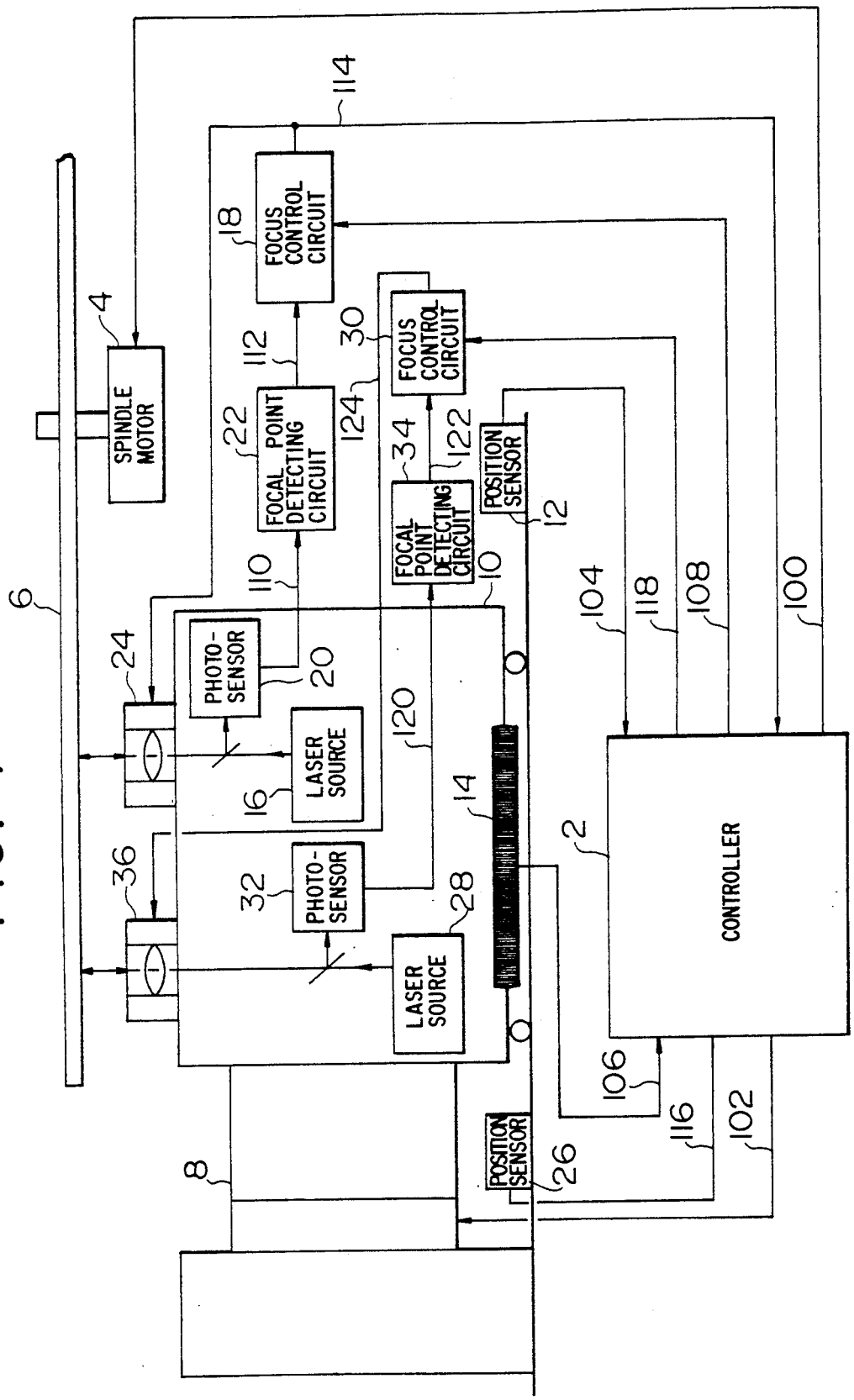
FIG. 4 is a block diagram showing a further embodiment of this invention.

FIG. 4 shows another embodiment of this invention. This embodiment uses a position sensor also for the positioning of the outer light spot to the outermost area.

At the start-up of the optical disk apparatus, the spindle motor 4 drives the optical disk 6 to rotate in response to the signal 100 from the controller 2, and the auto-focusing servo system for the inner light spot $SP_1$ is started over the innermost unused track area A. After the disk information in the control track area B has been read, the recording/reproduction head 10 is moved outwardly over the optical disk 6. The operations up to this time point are identical to the former embodiment of FIG. 1. When the head 10 comes to the position at which the outer light spot $SP_2$ can reach the outermost unused track area D, the position sensor 26 produces a terminal point signal 116.

The controller 2 responds to this signal to implement position lock for the recording/reproduction head 10 using the head position signal 106 from the linear encoder 14 and the drive signal 102, and thereafter activate the outer laser source 28. From the output signal 120 of the photosensor 32, the focal point detecting circuit 34 produces the out-of-focus signal 122, which is delivered to the outer focus control circuit 30.

Upon detecting the upper maximum or lower maximum swing point of the optical disk 6 through the observation of the output signal 114 which drives the inner lens actuator 24, the controller 2 issues the auto-focusing servo system start-up signal 118 to the outer focus control circuit 30. The output signal 124 of the outer focus control circuit 30 drives the actuator 36 so that the outer objective lens is moved vertically, thereby controlling the outer light spot $SP_2$ to be focused on the optical disk 6. The focusing control may use the feed forward signal from the auto-focusing servo system of the inner light spot as in the case of the preceding embodiment shown in FIG. 3.

Although in the foregoing embodiments the single recording/reproduction head produces two light spots, the number of light spots may be increased. In such cases, the auto-focusing servo system for the innermost light spot is first started and, by inferring the vertical swing of the optical disk based on the signal provided by the innermost system, auto-focusing servo systems for the outer light spots are started sequentially at a timing of a minimal disk swing velocity.

For example, assuming that the optical head produces three light spots separated in the radial direction of the disk, the innermost light spot is first produced, or energized and the auto-focusing system for the innermost light spot is started while the optical head is located at a first position where the innermost light spot projects on the inner unused track area. Next, the optical head is moved to a second position where the intermediate light spot should project on the outer unused track area and then the intermediate light spot is produced and the auto-focusing system for the intermediate light spot is started while the optical head is located at the second position. Finally, the optical head is moved to a third position where the outermost light spot should project on the outer unused track area and then the outermost light spot is produced and the auto-focusing system is started while the optical head is maintained at the third position.

What is claimed is:

1. A method of starting up auto-focusing servo systems which focus a plurality of light spots produced by an optical head on an optical disk in positions different from each other in a radial direction of said disk, said disk having unused track areas in inner and outer sections thereof and a data recording area between said unused track areas, said method comprising the steps of:

starting an auto-focusing servo system for an innermost light spot of said plurality of light spots while projecting said innermost light spot on said inner unused track area; and successively starting auto-focusing servo systems for remaining light spots of said plurality of light spots while successively projecting said remaining light spots on said outer unused track area, said remaining light spots being successively projected on said outer unused track area by moving said optical head to successive positions where said remaining light spots are successively projected on said outer unused track area.

2. A method according to claim 1, wherein the auto-focusing servo systems for said remaining light spots are started at timings indicated by a signal provided by said innermost light spot auto-focusing servo system.

3. A method according to claim 1, wherein the auto-focusing servo systems for said remaining light spots are started in response to respective signals which are respective signals of said auto-focusing servo systems for said remaining light spots superimposed by a signal of said innermost light spot auto-focusing servo system.

4. A method according to claim 1, wherein said innermost and remaining light spots are projected on said disk at respective positions spaced apart from each other over a radial distance between said inner unused track area and said outer unused track area.

5. A method according to claim 1, wherein, after said innermost light spot auto-focusing servo system has been started, said innermost light spot is used to read information from a control track area which is provided in proximity to said inner unused track area, thereby to determine whether following operations are to proceed.

6. A method according to claim 1, wherein said remaining light spots are produced after said innermost light spot has been positioned to an intended track in said recording area.

7. A method according to claim 1, wherein a position of said optical head where said innermost light spot is projected on said inner unused track area is detected by an inner position sensor.

8. A method according to claim 1, wherein said successive positions of said optical head where said remaining light spots are successively projected on said outer unused track area are successively detected by an outer position sensor.

9. A method of starting up auto-focusing servo systems which focus a plurality of light spots produced by an optical head on an optical disk in positions different in the disk radial direction, said method comprising the steps, at producing said light spots, of: starting the auto-focusing servo system for said first light spot among said plurality of light spots; inferring the vertical swing of said optical disk on the basis of a signal of said first light spot auto-focusing servo system; and starting the auto-focusing servo system for the remaining light spot at a timing of an upper maximum swing point or lower maximum swing point of said disk.

10. A method according to claim 9 uses, as said optical disk, an optical disk having unused track areas in the inner and outer sections thereof and a data recording area between said unused areas, wherein said first and remaining light spots are produced on said disk at positions spaced out from each other by virtually half the radial distance between said inner unused track area and said outer unused track area, and wherein said method comprises the steps of: producing the first light spot in said inner unused track area; starting the auto-focusing servo system for said first light spot; moving said optical head toward the outer section; producing a remaining light spot in said outer unused track area; and starting the auto-focusing servo system for the remaining light spot.

11. A method according to claim 9, wherein the auto-focusing servo system for said remaining light spot is started in response to a signal which is a signal of said remaining light spot auto-focusing servo system superimposed by a signal of said first light spot auto-focusing servo system.

12. A method according to claim 10, wherein, after said first light spot auto-focusing servo system has been started, said first light spot is used to read information from a control track area which is provided in proximity to said inner unused track area, thereby to determine whether following operations are to proceed.

13. A method according to claim 10, wherein said remaining light spot is produced after said first light spot has been positioned to an intended track in said recording area.

14. A method of starting up auto-focusing servo systems which focus first and second light spots on an optical disk, which has unused track areas in inner and outer sections thereof and a data recording area between said unused track areas, in positions spaced apart from each other by about half of a radial distance between said inner and outer unused track areas, said method comprising the steps of:
producing said first light spot in said inner unused track area;
starting an auto-focusing servo system for said first light spot;
reading information from a control track area which is provided in proximity to said inner unused track area; and
determining, on the basis of said information read from said control track area, whether or not an auto-focusing servo system for said second light spot is to be started.

15. A method according to claim 14, wherein, when it is determined that said auto-focusing servo system for said second light spot is to be started, said optical head is moved outwardly, said second light spot is produced in said outer unused track area, and said second light spot auto-focusing servo system is started at a timing indicated by a signal of said first light spot auto-focusing servo system.

16. An optical disk apparatus comprising: a optical head which produces first and second light spots on an optical disk, which has unused track areas in the inner and outer sections thereof and a data recording area between said unused areas, in positions different in the disk radial direction; first and second auto-focusing servo systems which focus said first and second light spots on the recording plane of said disk; and a controller which implements on-off control for said first and second light spots, movement control for said optical head, and start-up control for said first and second auto-focusing servo systems, said controller producing said first light spot in said inner unused track area, starting said first auto-focusing servo system, moving said optical head outwardly over the disk, producing said second light spot in said outer unused track area, and starting said second auto-focusing servo system.

17. An apparatus according to claim 16, wherein said controller starts said second auto-focusing servo system at a timing indicated by a signal of said first auto-focusing servo system.

18. An apparatus according to claim 16, wherein a signal of said first auto-focusing servo system is superimposed on a signal of said second auto-focusing servo system.

19. An apparatus according to claim 16, wherein said optical head is designed to produce said first and second light spots on said disk at positions spaced out from each other by virtually half the radial distance between said inner unused track area and said outer unused track area.

20. An apparatus according to claim 16, wherein said controller functions, after starting said first auto-focusing servo system, to determine whether following operations are to proceed depending on information retrieved using said first light spot from a control track area which is provided in proximity to said inner unused track area.

21. An apparatus according to claim 16, further comprising a position sensor which detects that said optical head has reached a position in said inner unused track area where said first light spot is to be produced.

22. An apparatus according to claim 16, further comprising a position sensor which detects that said optical head has reached a position in said outer unused track area where said second light spot is to be produced.

* * * * *